(12) United States Patent
Endres et al.

(10) Patent No.: US 8,157,452 B2
(45) Date of Patent: Apr. 17, 2012

(54) RADIAL ROLLER BEARING FOR STORING SHAFTS IN WIND TURBINE TRANSMISSIONS

(75) Inventors: Bernd Endres, Unterspiesheim (DE); Christian Hoffinger, Georgensgmuend (DE); Alban Kronenberger, Uechtelhausen (DE); Tobias Mueller, Dipperz (DE)

(73) Assignee: Schaeffler KG, Herzogenaurach (DE)

( * ) Notice: Subject to any disclaimer, the term of this patent is extended or adjusted under 35 U.S.C. 154(b) by 299 days.

(21) Appl. No.: 12/515,784

(22) PCT Filed: Nov. 15, 2007

(86) PCT No.: PCT/DE2007/002070
§ 371 (c)(1),
(2), (4) Date: Aug. 24, 2009

(87) PCT Pub. No.: WO2008/061504
PCT Pub. Date: May 29, 2008

(65) Prior Publication Data
US 2010/0054650 A1    Mar. 4, 2010

(30) Foreign Application Priority Data
Nov. 22, 2006  (DE) .................. 10 2006 055 026

(51) Int. Cl.
*F16C 33/34* (2006.01)
*F16C 19/24* (2006.01)
(52) U.S. Cl. ......... 384/567; 384/548; 384/565; 384/572
(58) Field of Classification Search .................. 384/491, 384/494, 564–567, 584, 548, 572
See application file for complete search history.

(56) References Cited

U.S. PATENT DOCUMENTS

| | | | | |
|---|---|---|---|---|
| 3,337,278 A | * | 8/1967 | Vigh | 384/566 |
| 3,410,618 A | * | 11/1968 | Harris et al. | 384/567 |
| 4,002,380 A | * | 1/1977 | Bowen | 384/567 |
| 4,232,914 A | * | 11/1980 | Bowen, III | 384/567 |
| 5,033,877 A | * | 7/1991 | Bowen | 384/567 |
| 5,071,265 A | * | 12/1991 | Bowen et al. | 384/567 |
| 7,434,439 B2 | * | 10/2008 | Zurecki | 72/342.3 |

FOREIGN PATENT DOCUMENTS

| | | |
|---|---|---|
| DE | 21 23 981 Y | 12/1971 |
| DE | 21 52 125 A | 7/1972 |
| DE | 21 44 269 Y | 3/1973 |
| DE | 23 38 686 A | 3/1974 |
| DE | 2 53 655 Y | 1/1988 |

(Continued)

*Primary Examiner* — Marcus Charles
(74) *Attorney, Agent, or Firm* — Lucas & Mercanti, LLP

(57) ABSTRACT

A radial roller bearing for storing shafts in wind turbine transmissions, which has an external bearing ring with an inner runway, an internal bearing ring arranged coaxial thereto provided with an external runway, and a plurality of roller bodies that displace on the runways between the hearing rings held at regular intervals by a bearing cage. To prevent slip, the roller bodies are replaced by hollow rollers that have a greater diameter and a smaller elasticity module than the roller bodies ensuring, when the radial roller bearing is in the load-free state, permanent contact with the bearing rings, a permanent drive of the bearing cage and that the roller bodies have kinematic rotation. The hollow rollers have a higher bending strength, and their internal cover surface has a maximum surface roughness of $Rz \leq 25$ μm preventing localized peaks of tension, without any disaggregation in the axial direction.

7 Claims, 1 Drawing Sheet

FOREIGN PATENT DOCUMENTS

| | | |
|---|---|---|
| DE | 44 32 514 Y | 3/1996 |
| DE | 198 40 738 Y | 3/2000 |
| DE | 102 00 609 Y | 7/2003 |
| DE | 601 11 998 Y | 1/2006 |
| DE | 10 2004 062 774 Y | 3/2006 |
| FR | 2 479 369 | 10/1981 |
| GB | 20 04 600 Y | 4/1979 |
| JP | 2005331066 A * | 12/2005 |
| JP | 2006226357 A * | 8/2006 |
| JP | 2007303571 A * | 11/2007 |
| SU | 681249 A * | 8/1979 |
| SU | 706594 A * | 12/1979 |
| SU | 752065 B * | 7/1980 |
| WO | 03/057548 | 7/2003 |
| WO | 2006/066717 Y | 6/2006 |

* cited by examiner

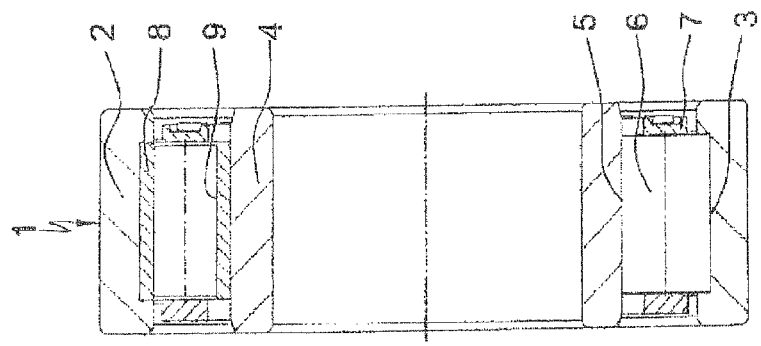
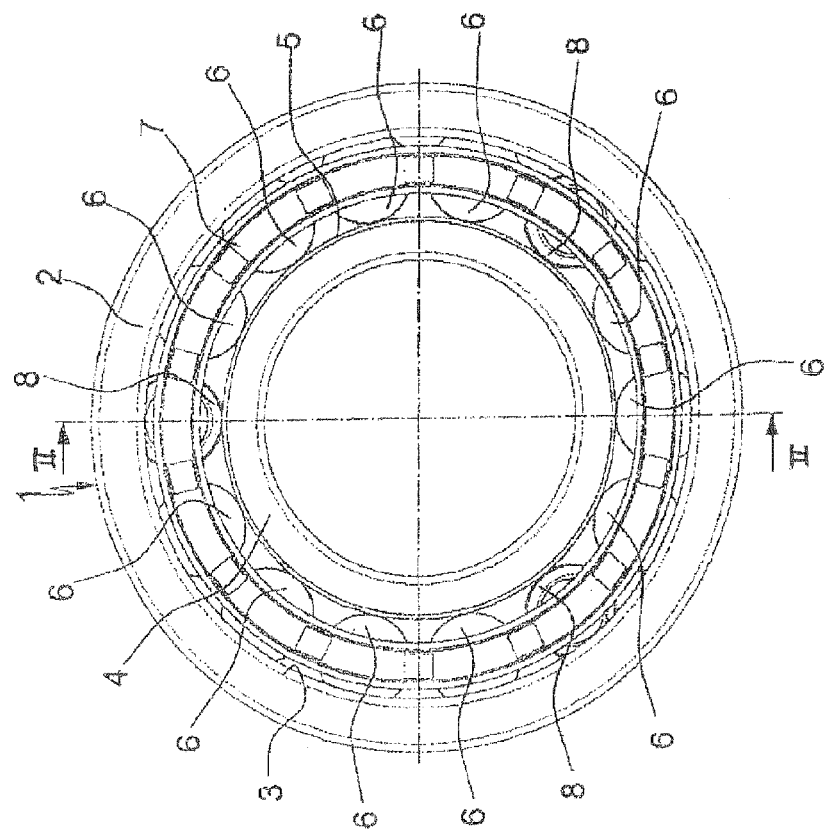

RADIAL ROLLER BEARING FOR STORING SHAFTS IN WIND TURBINE TRANSMISSIONS

This application is a 371 of PCT/DE2007/002070 filed Nov. 15, 2007, which in turn claims the priority of DE 10 2006 055 0269 filed Nov. 22, 2006, the priority of both applications is hereby claimed and both applications are incorporated by reference herein.

FIELD OF THE INVENTION

The invention relates to a radial roller bearing which can, for example, be used in conjunction with shafts in wind power transmissions.

BACKGROUND TO THE INVENTION

A person skilled in the art of roller bearing technology will in general be aware that radial roller bearings have an optimum kinematic operating state when sufficiently loaded, at which the roller bodies roll on the raceways of the inner and of the outer bearing ring, without sliding. Furthermore, in the case of radial roller bearings which are operated on low loads, at least at times, it is known that the roller body set, which comprises the roller bodies and their bearing cage, does not rotate at the kinematic rotation speed because of the friction in the bearing or because of the high mass force of the roller body set and the contact force, which is small at times, between the roller bodies and the raceways, In consequence, the rotation speed of the roller body set is less than the kinematic rotation speed, so that the roller bodies are in a kinematically non-optimum state, as a result of which slip occurs between these roller bodies and at least one raceway. In this case, a lubricating film can be formed on the contact surfaces between the roller bodies and the raceway. However, the lubrication film is destroyed in the event of a sudden change in the rotation speed or load, as a result of which there will no longer be an adequate lubricating film within a very short time at the contact points where the slip occurs. This results in a metallic contact between the raceway and the roller bodies, which slide on the raceway until the roller bodies are accelerated to the kinematic rotation speed. This large speed difference between the raceway and the roller bodies as well as the lack of a separating lubricating film therefore results in high tangential stresses in the surfaces of the raceway and of the roller bodies, which are associated with very severe wear, such as roughening of the raceways, material being torn off and rubbing marks, generally in conjunction with micropitting, thus leading to premature failure of the radial roller bearing.

A radial roller bearing of this generic type has therefore been proposed in FR 2 479 369, which essentially comprises an outer bearing ring with an inner raceway and an inner bearing ring, which is arranged coaxially with respect thereto, and has an outer raceway, as well as a multiplicity of roller bodies, which roll between the bearing rings on their raceways and are held at uniform distances from one another in the circumferential direction by a bearing cage, in which a plurality of roller bodies, which are distributed uniformly on the circumference between the roller bodies and the bearing rings, are replaced by hollow rollers in order to avoid the described slip effect and the disadvantages which result from this. These hollow rollers, which additionally are axially somewhat shorter than the other roller bodies, in this case have a slightly larger diameter and a lower modulus of elasticity than the other roller bodies, as a result of which, in the load-free state of the radial roller bearing, they make continuous contact with the bearing rings and therefore ensure a continuous drive of the bearing cage and thus of the other roller bodies at the kinematic rotation speed.

However, in practice, it has been found that the hollow rollers, which are subject to continuous bending fatigue load as a result of their permanent deformation, in radial roller bearings such as these represent potential weak points of the roller bearing in terms of their load capability and fatigue strength, thus resulting in reduced load-carrying capability and a shorter life of the roller bearing. For example, it has been found that local stress peaks occur on the inner envelope surfaces of the hollow rollers, leading to cracking and finally to fracture of the hollow rollers during long-term operation of the roller bearing. This was due in particular to a poor surface character of the inner envelope surfaces of the hollow rollers and the fact that the inner envelope surfaces of the hollow rollers additionally have microscopically fine grooves in the axial direction or at right angles to the maximum tensile stress, in which excessive stress concentrations occurred. One obvious measure to avoid such stress concentrations would admittedly be to increase the dimensions of both the hollow rollers and the other roller bodies, but this would necessarily result in an increase in the total space required for the bearing and an increase in the production costs for the roller bearing.

OBJECT OF THE INVENTION

Against the background of the described disadvantages of the known prior art, the invention is therefore based on the object of designing a radial roller bearing, in particular for the bearing of shafts in wind power transmissions, which, while greatly retaining its original performance features, such as the load capacity, installation space and service life, is equipped with hollow rollers in order to avoid slip between the roller bodies and the bearing rings, which hollow rollers have an increased bending fatigue strength without local stress peaks on their inner envelope surfaces.

DESCRIPTION OF THE INVENTION

According to the invention, in the case of a radial roller bearing this object is achieved in that the inner envelope surfaces of the hollow rollers are formed with a maximum surface roughness, which avoids local stress peaks, of $R_z \leq 25$ μm, without any grooves in the axial direction.

The invention is therefore based on the realization that, by deliberately improving the surface character of the inner envelope surfaces of the hollow rollers, it is in fact possible to avoid the local stress peaks in the hollow rollers, which lead to cracking and finally to fracture of the hollow rollers, in the hollow rollers, and therefore to critically increase the fatigue strength of the hollow rollers, as well as the load capability and the life of such radial roller bearings.

Preferred refinements and developments of the radial roller bearing designed according to the invention are described in the dependent claims.

Accordingly, in one particularly advantageous refinement of the radial roller bearing designed according to the invention, the hollow rollers have the same axial length as the other roller bodies and their inner envelope surfaces are formed with a surface roughness of $R_z \leq 6.3$ μm. In this case, designing the hollow rollers to have the same axial length as the other roller bodies contributes to keeping the radial roller bearing load capability losses which result from the design of the hollow rollers as low as possible, while the value of the surface roughness of $R_z \leq 6.3$ μm represents an optimum with regard to the complexity and the costs for achieving a high surface quality on the inner envelope surfaces of the hollow rollers.

A first possible way to produce a surface quality such as this on the inner envelope surfaces of the hollow rollers of the radial roller bearing designed according to the invention in a simple and cost-effective manner is to process the inner envelope surfaces of the hollow rollers by hard turning. In general, hard turning means the turning of hard and hardened materials, with the largest field of application representing the machining of hardened steel materials such as through-hardened steels and case-hardened steels. During hard turning, the heat which was produced by the machining process in the cut zone is used in order to locally plasticize the material and therefore to achieve ductile material removal. Hard turning in this case represents an alternative to grinding and offers process-specific advantages, such as short set-up times, the capability for dry processing, and high flexibility.

A further possible way to achieve a high surface quality on the inner envelope surfaces of the hollow rollers of the radial roller bearing designed according to the invention is to process the inner envelope surfaces of the hollow rollers by hard smooth rolling. This processing method is a method for shaping which does not involve cutting and is based on the idea that the roughness profile of machined surfaces is smoothed under the contact pressure of hardened roller bodies, such as rollers or balls. This is done by plastic deformation of the profile peaks in such a way that the surface pressure which occurs between the rollers and the material produces three-dimensional compression stresses in the material which reach the yield stress of the material and thus result in local plastic deformation and major smoothing of the surface roughness, thus making it possible to achieve values in the region of $R_z=1$ μm. A further positive effect of this method is the simultaneous strengthening of the surface and the high inherent compressive stresses associated therewith in the edge area, which lead to a further increase in the bending fatigue strength of the hollow rollers.

Finally, as a further possible way to achieve a high surface quality on the inner envelope surfaces of the hollow rollers of the radial roller bearing the inner envelope surfaces of the hollow rollers can be processed by grinding and planing. These surface-processing machining methods have been known for a long time for their high surface qualities and, therefore, require no further explanation at this point. However, it should nevertheless simply be mentioned that it is, of course, also possible to process the inner envelope surfaces of the hollow rollers by a combination of hard turning or hard smooth rolling as well as grinding and planing, or else by other suitable methods, such as complete turning before hardening or the like.

The radial roller bearing designed according to the invention therefore has the advantage over the radial roller bearings that are known from the prior art that, while greatly retaining its original performance features, such as load capacity, installation space and service life, it is equipped with hollow rollers in order to avoid slip between the roller bodies and the bearing rings, which hollow rollers have an increased bending fatigue strength and fatigue strength as a result of deliberate setting of the surface character on their inner envelope surfaces without local stress peaks. These advantages are in this case achieved even if the roller bodies are not guided by a bearing cage but guide themselves, as in the case of fully rolling bearings.

BRIEF DESCRIPTION OF THE DRAWINGS

One preferred embodiment of the radial roller bearing designed according to the invention will be explained in more detail in the following text with reference to the attached drawings, in which:

FIG. 1 shows a side view of a radial roller bearing designed according to the invention; and FIG. 2 shows the cross section II-II through the radial roller bearing designed according to the invention, as shown in FIG. 1.

DETAILED DESCRIPTION OF THE DRAWINGS

The illustrations in FIGS. 1 and 2 clearly show a radial roller bearing 1, which is suitable for the bearing of shafts in wind power transmissions and, in a known manner, comprises an outer bearing ring 2 with an inner raceway 3 and an inner bearing ring 4, which is arranged coaxially with respect thereto and has an outer raceway 5, as well as a multiplicity of roller bodies 6, which roll between the bearing rings 2, 4 on their raceways 3, 5 and are held at uniform distances from one another in the circumferential direction by a bearing cage 7. The drawings likewise clearly show that, in the case of the illustrated radial roller bearing 1, three roller bodies 6, which are distributed uniformly on the circumference, are replaced by hollow rollers 8 in order to avoid slip between the roller bodies 6 and the bearing rings 2, 4, which hollow rollers 8 have a slightly larger diameter and a lower modulus of elasticity than the other roller bodies 6, in order to ensure, in the load-free state of the radial roller bearing 1, a continuous contact with the bearing rings 2, 4 and thus a continuous drive for the bearing cage 7 and, thus, for the other roller bodies 6 at a kinematic rotation speed.

In order to ensure that local stress peaks, which could lead to cracking and to fracture of the hollow rollers 8 during continuous operation of the radial roller bearing 1, no longer occur on the inner envelope surfaces 9 of the hollow rollers 8, the hollow rollers 8 are further developed in the manner according to the invention to have an increased bending fatigue strength. This is achieved in that the hollow rollers 8 have the same axial length as the other roller bodies 6 and their inner envelope surfaces 9 are formed with a surface roughness of $R_z \leq 6.3$ μm without any grooves in the axial direction. A high surface quality such as this can be produced particularly easily and cost-effectively by processing of the inner envelope surfaces 9 of the hollow rollers 8 by means of hard turning, in which the heat which is produced by the machining process in the cut zone is used in order to locally plasticize the material and, therefore, to achieve ductile material removal.

LIST OF REFERENCE SYMBOLS

1 Radial roller bearing
2 Outer bearing ring
3 Inner raceway
4 Inner bearing ring
5 Outer raceway
6 Roller body
7 Bearing cage
8 Hollow rollers
9 Inner envelope surfaces
$R_z$ surface roughness

The invention claimed is:
1. A radial roller bearing for a bearing of shafts in wind power transmissions, comprising:

an outer hearing ring having an inner raceway;
an inner bearing ring being arranged coaxially with respect thereto having an outer raceway;
a bearing cage;
a multiplicity of roller bodies rolling between the outer bearing ring and the inner bearing ring on the inner raceway and the outer raceway being and held at uniform distances from one another in a circumferential direction by the bearing cage; and
hollow rollers interspersed between the roller bodies to avoid slip between the roller bodies and the outer hearing ring and the inner bearing ring, the hollow rollers having an inner envelope surface, a slightly larger diameter and a lower modulus of elasticity than the roller bodies, ensuring, in a load-free state of the radial roller bearing, a continuous contact with the outer bearing ring and the inner bearing ring and a continuous drive for the bearing cage and for the roller bodies at a kinematic rotation speed,
wherein the hollow rollers have an increased bending fatigue strength than known hollow rollers, and the inner envelope surfaces are formed with a maximum surface roughness, which avoids local stress peaks of $R_z \leqq 25$ μm, without any grooves in an axial direction.

2. The radial roller bearing of claim 1, wherein the hollow rollers have a same axial length as the roller bodies and inner envelope surfaces of the hollow rollers are formed with a surface roughness of $R_z \leqq 6.3$ μm.

3. The radial roller hearing of claim 2, wherein the inner envelope surfaces of the hollow rollers are hard turned surfaces.

4. The radial roller bearing of claim 3, wherein the inner envelope surfaces of the hollow rollers are formed by a combination of hard turning, grinding and planing.

5. The radial roller bearing of claim 2, wherein the inner envelope surfaces of the hollow rollers hard smooth rolling surfaces.

6. The radial roller bearing of claim 2, wherein the inner envelope surfaces of the hollow rollers are ground and planned surfaces.

7. The radial roller bearing of claim 2, wherein the inner envelope surfaces of the hollow rollers are formed by a combination of hard smooth rolling, grinding and planing.

* * * * *